(12) United States Patent
Hanada

(10) Patent No.: US 11,988,262 B2
(45) Date of Patent: May 21, 2024

(54) DAMPING STOPPER

(71) Applicant: NOK CORPORATION, Tokyo (JP)

(72) Inventor: Yuki Hanada, Tottori (JP)

(73) Assignee: NOK CORPORATION (JP)

(*) Notice: Subject to any disclaimer, the term of this patent is extended or adjusted under 35 U.S.C. 154(b) by 0 days.

(21) Appl. No.: 18/187,973

(22) Filed: Mar. 22, 2023

(65) Prior Publication Data

US 2023/0228314 A1    Jul. 20, 2023

Related U.S. Application Data

(62) Division of application No. 16/767,620, filed as application No. PCT/JP2018/043480 on Nov. 27, 2018, now abandoned.

(30) Foreign Application Priority Data

Dec. 15, 2017   (JP) ................. 2017-240274

(51) Int. Cl.
| | | |
|---|---|---|
| *B62D 3/12* | (2006.01) | |
| *B62D 7/22* | (2006.01) | |
| *F16F 1/371* | (2006.01) | |
| *F16F 1/373* | (2006.01) | |
| *F16F 1/44* | (2006.01) | |
| *F16F 13/02* | (2006.01) | |
| *F16F 15/02* | (2006.01) | |

(52) U.S. Cl.
CPC ............. *F16F 13/02* (2013.01); *B62D 3/123* (2013.01); *B62D 7/226* (2013.01); *F16F 1/3713* (2013.01); *F16F 1/3732* (2013.01); *F16F 1/445* (2013.01); *F16F 15/022* (2013.01); *B62D 3/12* (2013.01); *F16F 2224/02* (2013.01); *F16F 2224/0208* (2013.01); *F16F 2224/025* (2013.01); *F16F 2226/04* (2013.01); *F16F 2226/042* (2013.01); *F16F 2232/08* (2013.01); *F16F 2234/02* (2013.01); *F16F 2236/045* (2013.01)

(58) Field of Classification Search
CPC .... F16F 13/02; F16F 2236/045; F16F 15/022; F16F 1/3735; B62D 3/123; B62D 3/12
See application file for complete search history.

(56) References Cited

U.S. PATENT DOCUMENTS

| | | |
|---|---|---|
| 9,302,697 B2 | 4/2016 | Ohashi |
| 9,302,698 B2 | 4/2016 | Enomoto |
| 9,573,615 B2 | 2/2017 | Schaumann |

(Continued)

FOREIGN PATENT DOCUMENTS

| | | |
|---|---|---|
| CN | 203666761 U | 6/2014 |
| CN | 104691606 A | 6/2015 |

(Continued)

*Primary Examiner* — Xuan Lan Nguyen
(74) *Attorney, Agent, or Firm* — Harness, Dickey & Pierce, P.L.C.

(57) ABSTRACT

A damping stopper is interposed between two members axially displaced relative to each other and is provided with an elastic body which, when the interval between the two members decreases, is axially compressed by the two members and expands radially outward. In the elastic body, a second member suppressing the expansion is located in one axial region and attached to the outer periphery. When axially compressed by the two members, the elastic body expands while receiving resistance by the second member. The expanding elastic body contacts the side wall of one of the two members.

7 Claims, 6 Drawing Sheets

(56) References Cited

U.S. PATENT DOCUMENTS

| | | |
|---|---|---|
| 9,975,574 B2 | 5/2018 | Ohashi et al. |
| 2015/0151787 A1 | 6/2015 | Ohashi |
| 2015/0274192 A1 | 10/2015 | Enomoto |

FOREIGN PATENT DOCUMENTS

| | | |
|---|---|---|
| CN | 104943733 A | 9/2015 |
| JP | H08-133102 A | 5/1996 |
| JP | 2001-271864 A | 10/2001 |
| JP | 2006-170386 A | 6/2006 |
| JP | 2015-112960 A | 6/2015 |
| JP | 2015-186950 A | 10/2015 |
| JP | 2016-008003 A | 1/2016 |
| JP | 2016-145618 A | 8/2016 |
| JP | 2016-145619 A | 8/2016 |

DAMPING STOPPER

CROSS REFERENCE TO RELATED APPLICATIONS

This application is a Divisional of U.S. patent application Ser. No. 16/767,620 filed May 28, 2020, which is a U.S. National Phase application of International Application No. PCT/JP2018/043480, filed on Nov. 27, 2018 and published in Japanese as WO2019/116878A1 on Jun. 20, 2019 and claims priority to Japanese Patent Application No. 2017-240274, filed on Dec. 15, 2017. The entire disclosures of the above applications are expressly incorporated by reference herein.

BACKGROUND

Technical Field

The disclosure relates to a damping stopper stopping the displacement of a movable member, the relative displacement between members, and the like while exhibiting a damping action.

Related Art

The damping stopper is used as a rack end stopper for an end of a steering rack provided in a steering gear of a vehicle, for example. As illustrated in FIG. 6, the rack end stopper compresses and deforms an elastic body 82 containing a rubber material between a rack housing 51 and a rack 61 axially facing each other and axially displaced relative to each other.

A damping stopper 81 damps a shock when the rack 61 collides with the rack housing 51 when a steering wheel is vigorously turned to a full lock in a hydraulically/electrically assisted steering rack, for example.

The damping of the shock by the damping stopper 81 is performed by absorbing the kinetic energy by the weight and the speed of a movable object (rack 61) by the displacement and the reaction force of the damping stopper 81 (elastic body 82). As illustrated in a graph of FIG. 7, the absorbable energy amount is defined by the size of an area S illustrated by a diagram obtained by the displacement amount and the reaction force of the damping stopper 81.

Therefore, in order to increase the absorbable energy amount, it is common to enlarge the area S by increasing the displacement amount of the damping stopper 81 or increasing the reaction force (Rigidity=Spring constant).

The above-described technique has room for improvement in the following points.

The damping stopper 81 requires a proper distortion in order to obtain a high reaction force like a nonlinear region as the characteristic of a common elastic material. In this point, the above-described structure requires an increase in the stopper size in order to satisfy a request function. However, a design space is limited due to the relationship with peripheral components, and thus the size increase is not easy.

As a solution technique for the above-described problem, it is considered to obtain a high reaction force by filling, with the elastic body 82 which is deformed by an input, a clearance c between a mating component (housing 51) and the stopper 81.

However, according to this technique, the reaction force sharply rises when the elastic body 82 reaches a filled state, and therefore efficient energy absorption cannot be performed. As a result, the absorbable energy amount cannot be increased.

It is an object of the disclosure to provide a damping stopper capable of increasing the absorbable energy amount.

SUMMARY

A damping stopper of the disclosure is provided with an elastic body provided between two members axially displaced relative to each other and, when the interval between the two members decreases, axially compressed by the two members and expanding radially outward and a second member attached to an outer periphery of the elastic body in one axial region of the elastic body and suppressing the expansion of the elastic body in the one region, in which the elastic body expands while receiving resistance by the second member to thereby contact a side wall provided in one member of the two members.

Effect

According to the disclosure, a resistance force by the second member is generated in an expansion process of the elastic body, and thus the absorbable energy amount can be increased.

DETAILED DESCRIPTION

Figure 1:
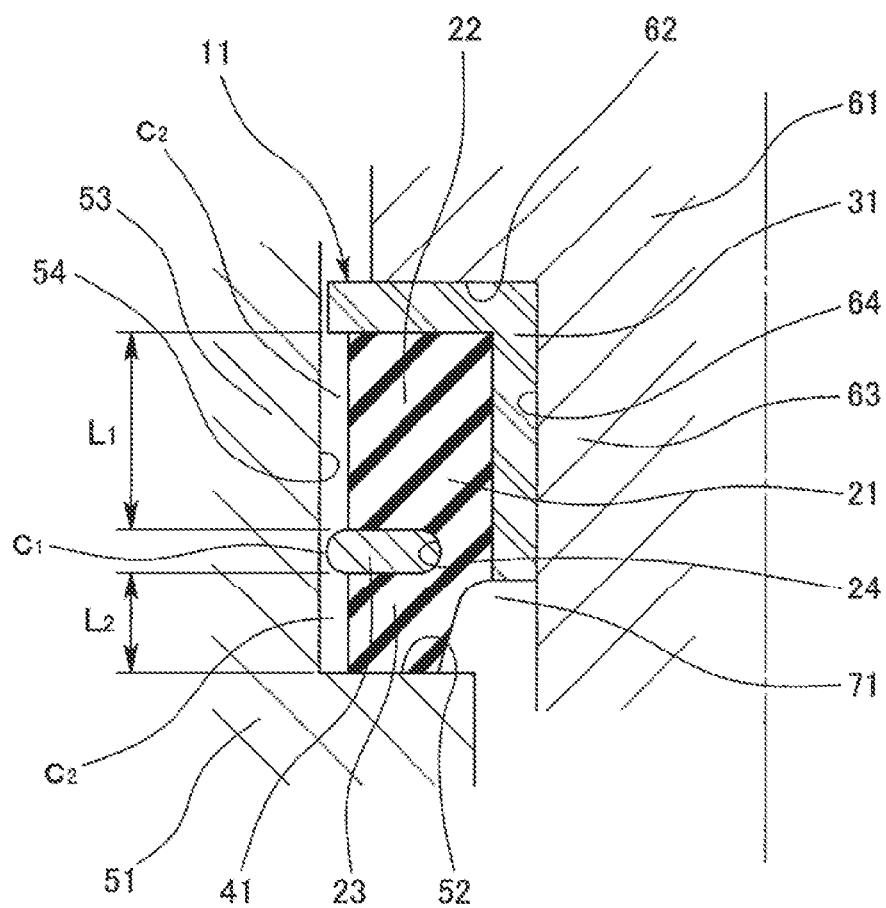
FIG. 1 is a cross-sectional view of a principal portion of a damping stopper of a first embodiment.
Figure 4:
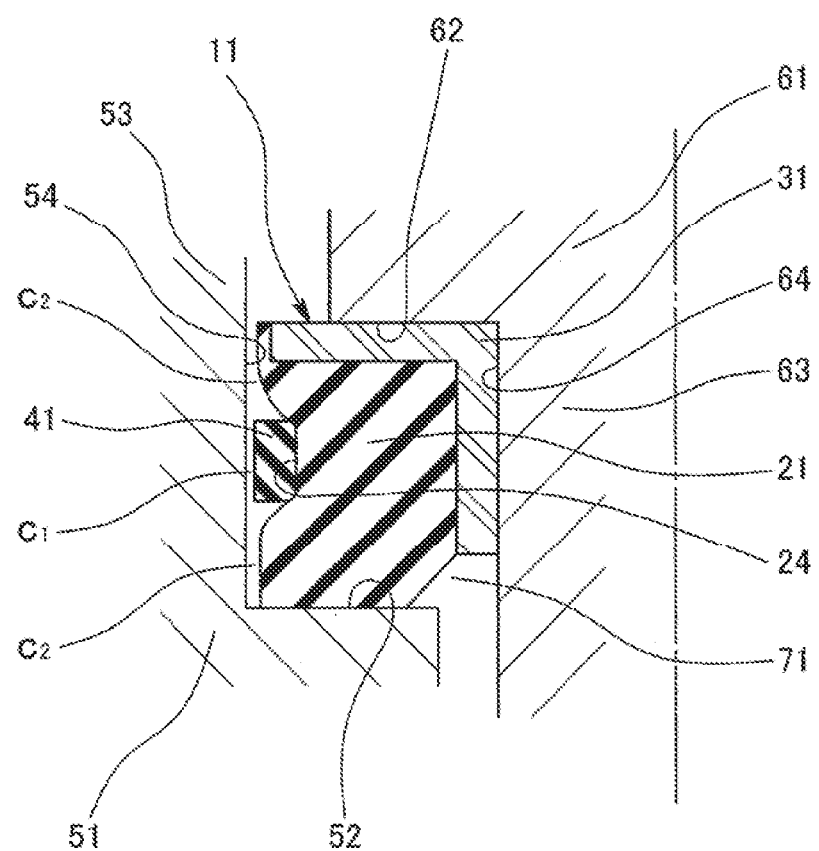
FIG. 4 is a cross-sectional view of a principal portion of a damping stopper of a second embodiment.

A damping stopper 11 of this embodiment is an example of a rack end stopper of a steering rack provided in a steering gear of a vehicle. As illustrated in FIG. 1 or FIG. 4, the damping stopper 11 is interposed between a rack housing 51 and a rack 61 as two members axially facing each other and axially displaced relative to each other.

The rack housing 51 has an end surface 52 having a planar shape perpendicular to the axis. On the outer periphery of the end surface 52, a level difference 53 is provided. On the inner peripheral surface of the level difference 53, a side wall 54 is provided. The rack 61 has an end surface 62 axially facing the end surface 52 of the rack housing 51. On the inner periphery of the end surface 62, a level difference 63 is provided. On the outer peripheral surface of the level difference 63, a side wall 64 is provided. Therefore, an annular mounting space 71, four sides of which are surrounded by the end surface 52 and the side wall 54 of the rack housing 51 and the end surface 62 and the side wall 64 of the rack 61, is provided. The damping stopper 11 forms an annular shape as a whole and mounted in the mounting space 71.

First Embodiment

Figure 2:
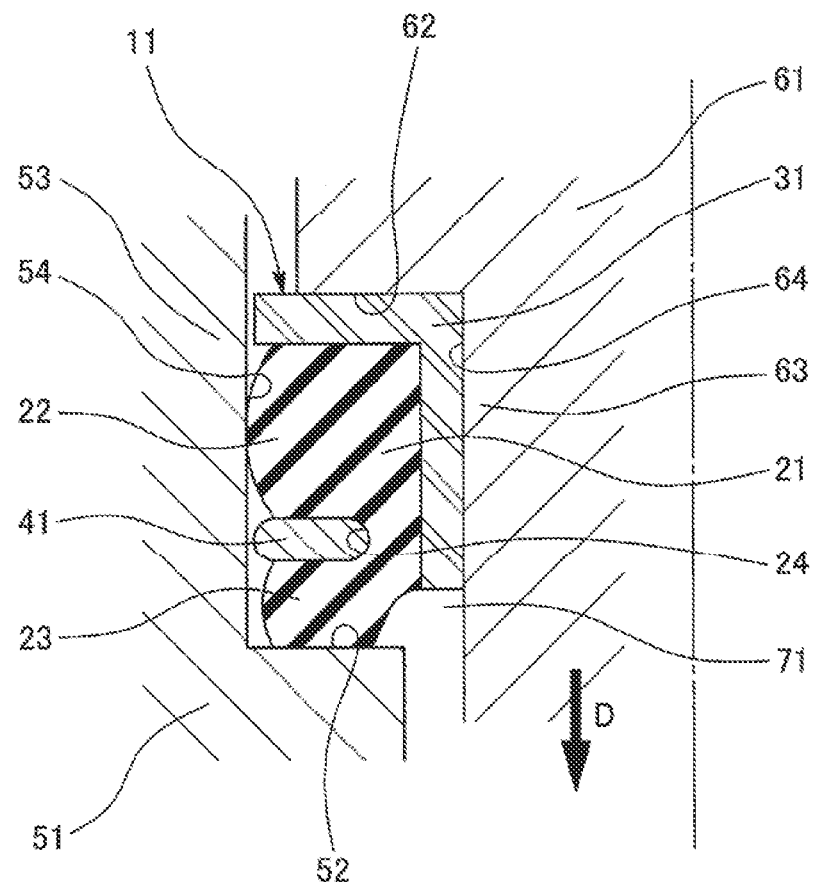
FIG. 2 is a cross-sectional view of a principal portion illustrating the operation state of the damping stopper.
Figure 3:
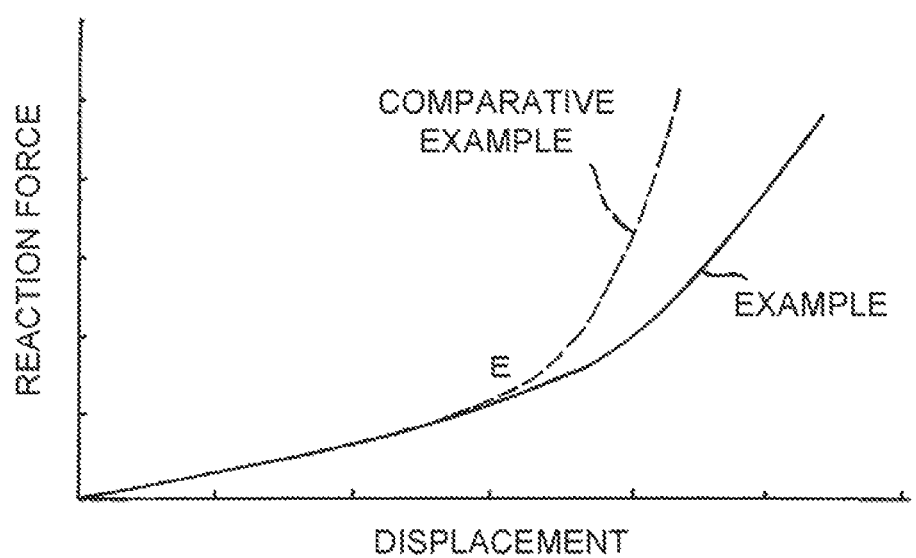
FIG. 3 is a graph illustrating the relationship between the displacement amount and the reaction force in the damping stopper.

A first embodiment is described based on FIG. 1 to FIG. 3.

As illustrated in FIG. 1, the damping stopper 11 has an elastic body 21 axially compressed between the end surface 52 of the rack housing 51 and the end surface 62 of the rack 61.

The elastic body 21 is formed into an annular shape by a predetermined rubber material. To one axial end (upper side in the figure, the rack 61 side) and the inner peripheral surface, a metal attachment ring 31 presenting an L-shaped cross section is bonded (vulcanized and bonded). As illustrated in FIG. 2, when the rack 61 is displaced in the direction of approaching the rack housing 51 (direction indicated by an arrow D) so that the interval between the end surfaces 52 and 62 decreases, the elastic body 21 is axially compressed by the rack housing 51 and the rack 61 and expands radially outward.

In the implementation of the disclosure, a metal attachment ring (not illustrated) may be bonded also to the other axial end (lower side in the figure, the rack housing 51 side) of the elastic body 21.

The damping stopper 11 has a second member 41 attached to one axial part of the outer periphery in the elastic body 21 and restricting the expansion of the elastic body 21 in the one axial part. More specifically, the second member 41 is attached to the outer periphery of the elastic body 21 in one axial region of the elastic body 21 and suppresses the expansion of the elastic body 21 in the one region.

The second member 41 is a ring body having rigidity such that the second member 41 does not contact the side wall 54 when the elastic body 21 expanding radially outward contacts the side wall 54. The ring body is formed of metal as an example and formed of resin as another example. The ring body has a shape in which the dimension in a direction orthogonal to the axis is larger than the axial dimension and is assembled to an annular mounting groove 24 provided in the elastic body 21. The mounting groove 24 is a groove provided beforehand in the outer peripheral surface of the elastic body 21.

The mounting groove 24 is formed at a position where the elastic body 21 is divided into a portion 22 of a length $L_1$ and a portion 23 of a length $L_2$. Therefore, the ring body configuring the second member 41 is attached to a position where the elastic body 21 is divided into the portion 22 of the length $L_1$ having a long axial length and the portion 23 of the length $L_2$ having a short axial length. It is needless to say that the axial length does not have an absolutely long-and-short relationship and has a relatively long-and-short relationship between the portions 22 and 23. Due to the structure, the ring body has an interleaf-like shape sandwiched between the portion of the length $L_1$ having a long axial length and the portion of the length $L_2$ having a short axial length of the elastic body 21.

As another embodiment, in order to facilitate the assembling work to the mounting groove 24, the annular second member 41 may be provided with a cut portion or the like in one place on the circumference. Moreover, the second member 41 may be buried in the elastic body 21 by carrying out insert molding in the vulcanization molding of the elastic body 21 by a mold. Considering the function or the like thereof, the second member 41 is also referred to as a resistance member or also referred to as an elastic body clamping member.

The outer diameter of the second member 41 is formed to be larger than the outer diameter of the elastic body 21. Therefore, the second member 41 is projected radially outward from the outer peripheral surface of the elastic body 21.

The outer diameter of the second member 41 is formed to be smaller than the inner diameter of the side wall 54 of the rack housing 51. Therefore, a radial clearance $c_1$ is formed between the second member 41 and the side wall 54. However, the second member 41 does not expand, and therefore it may be also structured so that the outer diameter of the second member 41 is set to be equal to the inner diameter of the side wall 54 so that the second member 41 is brought into contact with the side wall 54.

The outer diameter of the elastic body 21 is formed to be smaller than the inner diameter of the side wall 54 of the rack housing 51, and therefore radial clearances $c_2$ are formed between the elastic body 21 and the side wall 54.

In the damping stopper 11 of this embodiment, when the rack 61 is displaced in the direction of approaching the rack housing 51 (arrow D) so that the interval between the end surfaces 52 and 62 decreases, the elastic body 21 is axially compressed between the rack housing 51 and the rack 61 and expands radially outward corresponding to the compression. The second member 41 is attached to one axial part of the outer periphery of the elastic body 21, and therefore acts as a resistance element to the expansion of the elastic body 21. As a result, the radially outward expansion of the elastic body 21 is restricted in the one axial part.

As described above, the elastic body 21 is divided into the portion 22 of the length $L_1$ having a long axial length and the portion 23 of the length $L_2$ having a short axial length. The elastic body 21 expands in both the portions 22 and 23.

When the portion 22 of the length $L_1$ having a long axial length and the portion 23 of the length $L_2$ having a short axial length are compared, the portion 22 of the length $L_1$ has a surface area larger than that of the portion 23 of the length $L_2$ and more greatly extends radially outward than the portion 23 of the length $L_2$. As a result, the portion 22 of the length $L_1$ contacts the side wall 54 earlier than the portion 23 of the length $L_2$ as illustrated in FIG. 2. Then, a situation is realized in which the portion 23 of the length $L_2$ does not yet contact the side wall 54 even when expanding in a state where the portion 22 of the length $L_1$ expands and contacts the side wall 54.

Accordingly, the rise (increase) of the reaction force after the contact becomes slow as illustrated in a graph of FIG. 3. Therefore, the displacement amount until the allowable reaction force is reached increases, and thus efficient energy absorption is enabled and the absorbable energy amount can be increased.

In the graph of FIG. 3, Comparative Example illustrates a damping stopper of a conventional structure not having the second member 41 and the reaction force sharply rises after contact in Comparative Example, and therefore the displacement amount is small. A point E indicates the timing when the elastic body 21 contacts the side wall 54.

Second Embodiment

Figure 5:
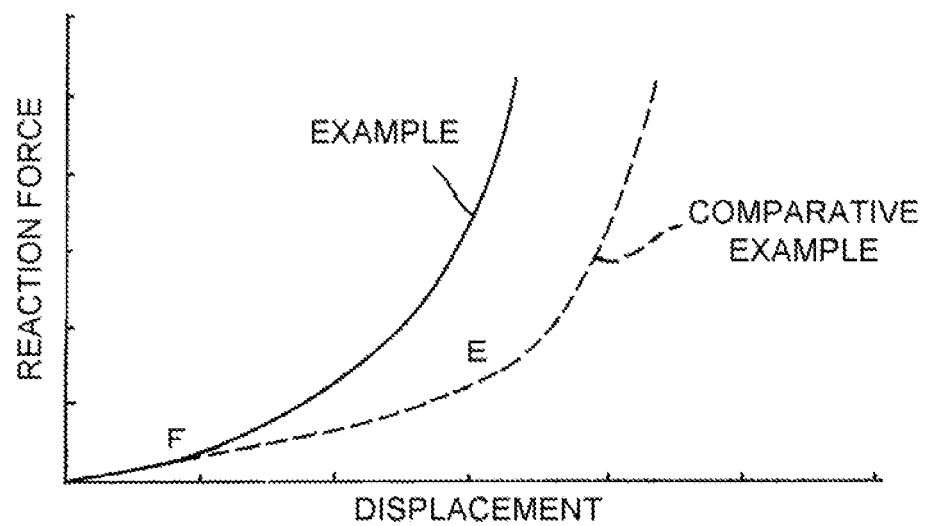
FIG. 5 is a graph illustrating the relationship between the displacement amount and the reaction force in the damping stopper.
Figure 6:
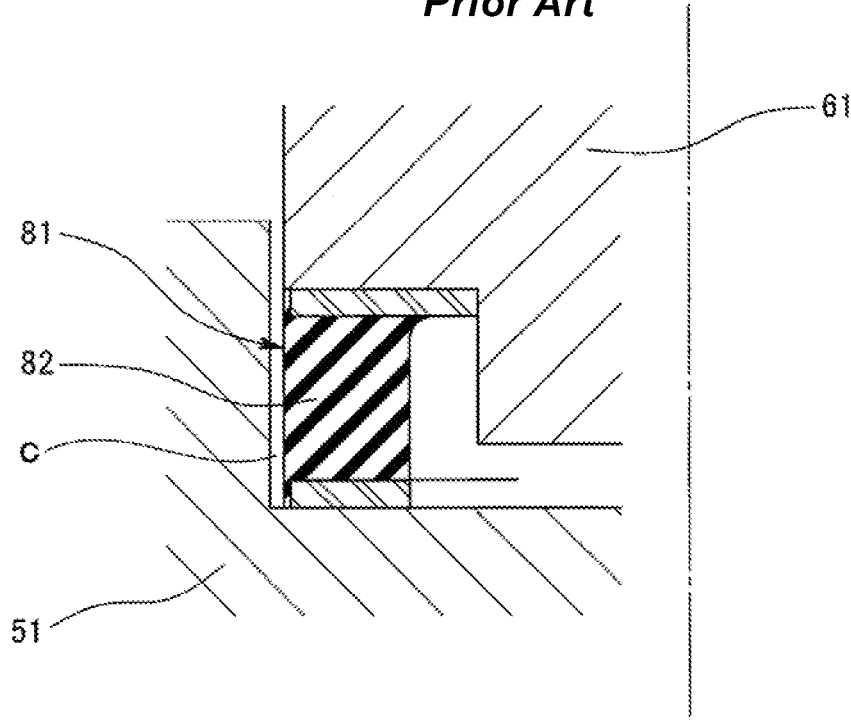
FIG. 6 is a cross-sectional view of a principal portion of a damping stopper described in the background art.
Figure 7:
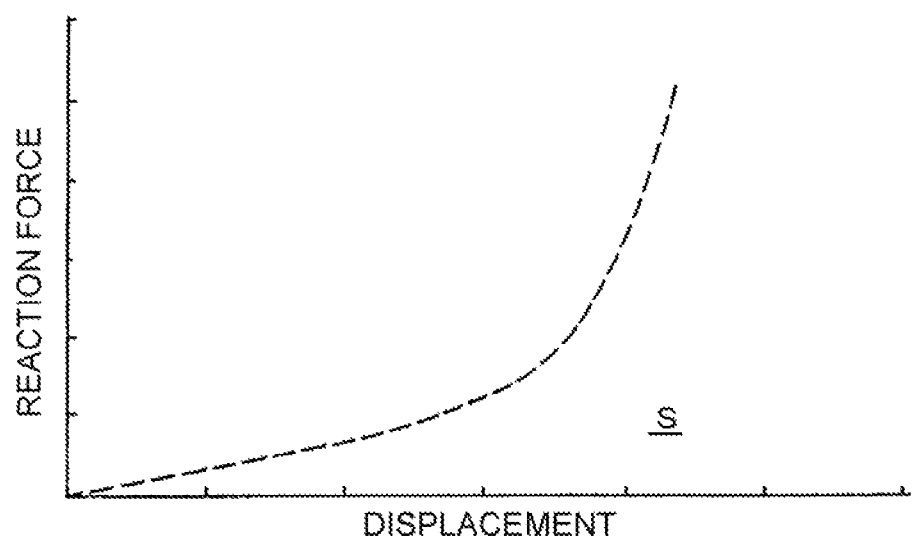
FIG. 7 is a graph illustrating the relationship between the displacement amount and the reaction force in the damping stopper.

A second embodiment is described based on FIG. 4 and FIG. 5. The same portions as those of the first embodiment are designated by the same reference numerals and a description thereof is omitted.

As illustrated in FIG. 4, a damping stopper 11 has an elastic body 21 axially compressed between an end surface 52 of a rack housing 51 and an end surface 62 of a rack 61.

The elastic body 21 is formed into an annular shape by a predetermined rubber material. To one axial end (upper side in the figure, the rack 61 side) and the inner peripheral surface, a metal attachment ring 31 presenting an L-shaped cross section is bonded (vulcanized and bonded). When the rack 61 is displaced in the direction of approaching the rack housing 51 so that the interval between the end surfaces 52 and 62 decreases, the elastic body 21 is axially compressed by the rack housing 51 and the rack 61 and expands radially outward.

In the implementation of the disclosure, a metal attachment ring (not illustrated) may be bonded also to the other axial end (lower side in the figure, the rack housing 51 side) of the elastic body 21.

The damping stopper 11 has a second member 41 attached to one axial part of the outer periphery of the elastic body 21 and restricting the expansion of the elastic body 21 in the one axial part. More specifically, the second member 41 is attached to the outer periphery of the elastic body 21 in one axial region of the elastic body 21 and suppresses the expansion of the elastic body 21 in the one region.

The second member 41 is a ring body having elasticity such that the second member 41 expands radially outward when pressed by the elastic body 21 expanding radially outward and rigidity higher than that of the elastic body 21 such that the second member 41 contacts a side wall 54 earlier than the elastic body 21. The ring body having such a characteristic has rigidity higher than that of the elastic body 21 by being formed of a material different from that of the elastic body 21. As an example, the second member 41 is formed of urethane.

As another embodiment, in order to facilitate the assembling work to a mounting groove 24, the ring body configuring the second member 41 may be provided with a cut portion in one place on the circumference. Alternatively, the ring body may be divided into two parts on the circumference to have a halved structure. Considering the function or the like thereof, the second member 41 is also referred to as a resistance member or also referred to as an elastic body clamping member.

The outer diameter of the second member 41 is formed to be larger than the outer diameter of the elastic body 21. Therefore, the second member 41 is projected radially outward from the outer peripheral surface of the elastic body 21.

The outer diameter of the second member 41 is formed to be smaller than the inner diameter of the side wall 54 of the rack housing 51. Therefore, a radial clearance $c_1$ is formed between the second member 41 and the side wall 54.

The outer diameter of the elastic body 21 is formed to be smaller than the inner diameter of the side wall 54 of the rack housing 51. Therefore, radial clearances $c_2$ are formed between the elastic body 21 and the side wall part 54.

In the damping stopper 11 of this embodiment, when the rack 61 is displaced in the direction of approaching the rack housing 51 so that the interval between the end surfaces 52 and 62 decreases, the elastic body 21 is axially compressed between the rack housing 51 and the rack 61 and expands radially outward corresponding to the compression. The second member 41 is attached to one axial part of the outer periphery of the elastic body 21, and therefore acts as a resistance element to the expansion. As a result, the radially outward expansion of the elastic body 21 is restricted in the one axial part.

When the elastic body 21 continuously expands in response to a load accompanying the displacement of the rack 61, the pressure by the expansion presses the second member 41 radially outward and expands the second member 41 radially outward (diameter enlarging deformation) to bring the second member 41 into contact with the side wall 54. In order to expand the second member 41 radially outward to bring the second member 41 into contact with the side wall 54, a large load is required. Therefore, the rigidity of the entire damping stopper 11 is increased, so that a high reaction force as compared with that in the case where the elastic body 21 is used alone is generated Thereafter, when the rack 61 is displaced in the direction of further approaching the rack housing 51 in the state where the second member 41 contacts the side wall 54, the second member 41 slides against the side wall 54, so that sliding resistance is generated between the second member 41 and the side wall 54. The rigidity is increased by the sliding resistance, so that a higher reaction force is generated.

As illustrated in a graph of FIG. 5, according to the damping stopper 11 of this embodiment, a sharp rise (increase) of the reaction force is already started at the timing (point F) when the second member 41 contacts the side wall 54. Thus, efficient energy absorption is enabled and the absorbable energy amount can be increased.

In the graph of FIG. 5, Comparative Example illustrates the characteristic by a damping stopper not having the second member 41. In Comparative Example, a sharp rise (increase) of the reaction force is started at the timing (point E) where the elastic body 21 contacts the side wall 54. Therefore, efficient energy absorption cannot be performed and the absorbable energy amount cannot be increased.

What is claimed is:

1. A steering rack assembly, comprising:
a steering rack housing defining a first sidewall and a first end surface that extends orthogonally outward from the first sidewall;
a steering rack that is axially displaceable relative to the steering rack housing, the steering rack defining a second sidewall and a second end surface that extends orthogonally outward from the second sidewall;
an annular mounting space positioned between the steering rack housing and the steering rack, and defined by the first sidewall, the second sidewall, the first end surface, and the second end surface; and
a steering rack damper positioned in the annular mounting space, wherein the steering rack damper includes:
an attachment ring including a first leg that is attached to and extends along the second end surface and a second leg that is attached to and extends along the second sidewall;
an elastic body attached to the attachment ring, the elastic body including a first axially extending surface that is attached the second leg and an opposite second axially extending surface that faces and is spaced apart from the first sidewall of the steering rack housing, the opposite second axially extending surface defining a mounting groove that separates the opposite second axially extending surface into a first portion have a first axial length and a second portion having a second axial length that is less than the first axial length, and the elastic body being configured to be axially compressed by the steering rack and the steering rack housing as the steering rack is axially displaced relative to the steering rack housing; and a rigid ring located in the mounting groove of the elastic body and spaced apart from the first sidewall of the steering rack housing, wherein as the elastic body is axially compressed as the steering rack is axially displaced relative to the steering rack housing, the rigid ring suppresses outward expansion of the elastic body such that the first portion of the opposite second axially extending surface expands outward and contacts the first sidewall and the second portion of the opposite second axially extending surface expands outward without contacting the first sidewall.

2. The steering rack assembly according to claim 1, wherein the rigid ring is located in the mounting groove such that the rigid ring is always spaced apart from the first sidewall.

3. The steering rack assembly according to claim 1, wherein the rigid ring is formed of a metal material or a polymeric material.

4. The steering rack assembly according to claim 1, wherein a radial length of the rigid ring is greater than an axial length of the rigid ring.

5. The steering rack assembly according to claim 1, wherein an inner wall of the mounting groove is positioned nearer to the first axially extending surface of the elastic body in comparison to the second axially extending surface of the elastic body.

6. The steering rack assembly according to claim 1, wherein the rigid ring is configured to suppress outward expansion of the elastic body such that axial compression of the elastic body is increased to increase an amount of energy absorbed by the elastic body as the steering rack is axially displaced relative to the steering rack housing.

7. The steering rack assembly according to claim 1, wherein the rigid ring is buried in the elastic body.

* * * * *